United States Patent
Muramatsu et al.

(10) Patent No.: US 7,567,280 B2
(45) Date of Patent: Jul. 28, 2009

(54) SOLID-STATE IMAGING DEVICE, ANALOGUE-DIGITAL CONVERTING METHOD IN SOLID-STATE IMAGING DEVICE AND IMAGING APPARATUS

(75) Inventors: Yoshinori Muramatsu, Kanagawa (JP); Noriyuki Fukushima, Kanagawa (JP); Yoshikazu Nitta, Tokyo (JP); Yukihiro Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 11/421,819

(22) Filed: Jun. 2, 2006

(65) Prior Publication Data

US 2006/0284999 A1    Dec. 21, 2006

(30) Foreign Application Priority Data

Jun. 2, 2005    (JP)    ............................ P2005-162327

(51) Int. Cl.
*H04N 3/14* (2006.01)
*H03M 1/12* (2006.01)

(52) U.S. Cl. ........................ 348/294; 341/155; 341/156

(58) Field of Classification Search ................. 348/308, 348/122, 294; 341/155, 156
See application file for complete search history.

(56) References Cited

U.S. PATENT DOCUMENTS

| 4,996,413 A | * | 2/1991 | McDaniel et al. ......... 250/208.1 |
| 5,877,715 A | * | 3/1999 | Gowda et al. ............... 341/122 |
| 6,130,713 A | * | 10/2000 | Merrill ........................ 348/308 |

* cited by examiner

*Primary Examiner*—John M Villecco
*Assistant Examiner*—Selam T Gebriel
(74) *Attorney, Agent, or Firm*—Sonnenschein Nath & Rosenthal LLP

(57) ABSTRACT

The present invention provides a solid-state imaging device including: a pixel array block; a row scanning device; and an analogue-digital conversion device, the analogue-digital conversion device including: a comparing device having a reset device; a counting device that counts a comparison period from initiation to completion of comparison performed by the comparing device; and a changing device that changes a voltage at the other input terminal to a predetermined voltage after a resetting operation performed by the reset device.

4 Claims, 6 Drawing Sheets

SOLID-STATE IMAGING DEVICE, ANALOGUE-DIGITAL CONVERTING METHOD IN SOLID-STATE IMAGING DEVICE AND IMAGING APPARATUS

CROSS REFERENCE TO RELATED APPLICATIONS

The present invention contains subject matter related to Japanese Patent Application JP 2005-162327 filed in the Japanese Patent Office on Jun. 2, 2006, the entire contents of which being incorporated here by reference.

BACKGROUND OF THE INVENTION

1. Field of the Invention

The present invention relates to a solid-state imaging device, an analogue-digital converting method in the solid-state imaging device, and an imaging apparatus and, more specifically, to a solid-state imaging device configured to convert an analogue signal outputted from a unit pixel via a column signal line into a digital signal and read the digital signal, an analogue-digital converting method in the solid-state imaging device and an imaging apparatus in which the solid-state imaging device is employed as an imaging device.

In recent years, a CMOS image sensor including a column parallel Analogue-Digital Converter (hereinafter, referred to as "ADC"), in which ADCs are arranged on a column-to-column basis in a row-column (matrix) array of unit pixels, mounted thereon has been reported (for example, see W. Yang et. al, "An Integrated 800×600 CMOS Image System" ISSCC Digest of Technical Papers, pp. 304-305, February 1999).

2. Description of the Related Art

FIG. 8 is a block diagram showing a configuration of a CMOS image sensor 100 including a column parallel ADC mounted thereon according to the related art.

In FIG. 8, a unit pixel 101 includes a photodiode and an in-pixel amplifier, and constitutes a pixel array block 102 by being arranged two-dimensionally in a row and column array. In the row-column pixel arrangement in the pixel array block 102, row control lines 103 (103-1, 103-2, . . . ) are wired on a row-to-row basis and column signal lines 104 (104-1, 104-2, . . . ) are wired on a column-to-column basis. Control of a row address and a row scanning in the pixel array block 102 is performed by a row scanning circuit 105 via the row control lines 103-1, 103-2, . . . .

ADCs 106 are arranged for the respective column signal lines 104-1, 104-2, . . . and constitute a column processing block (column parallel ADC block) 107 on one side of the column signal lines 104-1, 104-2, . . . . A Digital-Analogue Converter (hereinafter, referred to as "DAC") 108 for generating reference voltages RAMP of a RAMP waveform and a counter 109 for counting time period during which a comparing operation is performed by a comparator 110, described later, by performing a counting operation synchronously with a clock CK of a predetermined cycle are also provided for the respective ADCs 106.

Each ADC 106 includes the comparator 110 for comparing an analogue signal obtained from the unit pixel 101 in a selected row via the column signal lines 104-1, 104-2, . . . with the reference voltage RAMP generated by the DAC 108 for each column control line 103-1, 103-2, . . . , and a memory unit 111 for retaining a counted value of the counter 109 in response to the compared result outputted from the comparator 110, and has a function to convert an analogue signal provided from the unit pixel 101 into an N-bit digital signal.

Control of a column address and a column scanning for each ADC 106 of the column processing block 107 is performed by a column scanning circuit 112. In other words, the N-bit digital signals which are AD-converted by the respective ADCs 106 are read by a horizontal output line 113 of 2N bit in width in sequence by column scanning by the column scanning circuit 112, and are transmitted to signal processing circuit 114 by the horizontal output line 113. The signal processing circuit 114 includes 2N sense circuits corresponding to the horizontal output line 113 of 2N bit in width, a subtract circuit and an output circuit.

A timing control circuit 115 generates clock signals or timing signals used for the operations of the row scanning circuit 105, the ADC 106, the DAC 108, the counter 109 and the column scanning circuit 112 on the basis of a master clock MCK, and supplies these clock signals or the timing signals to the corresponding circuit member.

Referring now to a timing chart in FIG. 9, an operation of the CMOS image sensor 100 according to the related art configured as described above will be described below.

After a first reading operation from the unit pixels 101 of a certain selected row to the column signal lines 104-1, 104-2, . . . is stabilized, the reference voltage RAMP of the RAMP waveform is applied from the DAC 108 to the comparators 110. Consequently, the comparators 110 compare signal voltages Vx of the column signal lines 104-1, 104-2, . . . and the reference voltage RAMP. When the reference voltage RAMP and the signal voltages Vx become the same during this comparing operation, polarities of outputs Vco from the comparators 110 are inverted. In response to the reception of the inverted outputs from the comparators 110, a count value N1 of the counter 109 corresponding to a comparison period of the comparators 110 is retained in the memory unit 111.

In this first reading operation, a reset component ΔV of the unit pixel 101 is read. The reset component ΔV contains fixed pattern noise which varies from the unit pixel 101 to the unit pixel 101 as an offset. However, since the variation in reset component is generally small and a reset level is common for all the pixels, the signal voltage Vx of the column signal line 104 at the first reading is almost known. Therefore, at the first reading of the reset component ΔV, the comparison period of the comparator 110 can be shortened by adjusting the reference voltage RAMP of the RAMP waveform. In this related art, the reset component ΔV is compared during a count period (128 clocks) which corresponds to 7 bits.

In a second reading operation, the signal component corresponding to the amount of incident light is read for each unit pixel 101 in addition to the reset component ΔV in the same operation as in the case of the first reading operation. In other words, after the second reading operation from the unit pixels 101 of the certain selected row to the column signal lines 104-1, 104-2, . . . is stabilized, the reference voltage RAMP of the RAMP waveform is provided from the DAC 108 to the comparators 110. Consequently, the comparators 110 compare the signal voltages Vx of the column signal lines 104-1, 104-2, . . . and the reference voltage RAMP.

Simultaneously with provision of the reference voltage RAMP to the comparators 110, the counter 109 performs the second counting operation. Then, when the reference voltage RAMP and the signal voltages Vx become the same during the second comparing operation, the polarities of the outputs Vco from the comparators 110 are inverted. In response to the reception of the inverted outputs from the comparators 110, a count value N2 of the counter 109 corresponding to the comparison period of the comparators 110 is retained in the memory unit 111. At this time, the first count value N1 and the second count value N2 are retained in the different places in the memory unit 111.

After completion of the series of AD converting operations described above, the N-bit digital signals of the first time and the second time retained in the memory unit 111 are supplied to the signal processing circuit 114 via the 2N horizontal output lines 113 by the column scanning by the column scanning circuit 112, are applied with subtracting process of (second signal)−(first signal) in the subtract circuit (not shown) in the signal processing circuit 114, and are outputted toward an outside. Subsequently, by repeating the same operation for each row in sequence, a two-dimensional image is generated.

SUMMARY OF THE INVENTION

As described above, in the ADCs 106, the signal voltages Vx obtained from the unit pixels 101 of the selected row via the column signal lines 104-1, 104-2, . . . are compared with the reference voltage RAMP generated in the DAC 108 by the comparators 110, and the count value of the counter 109 is stored in the memory unit 111 in response to the compared results outputted therefrom, so that the operation to convert the signal voltages Vx to the N-bit digital signals is achieved.

The comparator 110 employed here may be the one having a configuration of a differential amplifier which is generally well known. When a state in which voltages at two input terminals of the differential amplifier are balanced is compared with a state in which the signal voltage Vx is applied to one of the two input terminals and the reference voltage RAMP is applied to the other input terminal directly with the comparator 110 having the configuration of the differential amplifier, the output of the comparator 110 might not be inverted at all, or might be inverted immediately after input of the reference voltage RAMP although there may be a case in which it is inverted normally during input of the reference voltage RAMP.

Accordingly, it is desirable to provide a solid-state imaging device in which an output of compared result can be inverted reliably during input of a reference voltage RAMP in an AD converting operation using a comparator having a configuration of a differential amplifier, an AD converting method using the solid-state imaging device, and an imaging apparatus.

According to an embodiment of the present invention, there is provided a solid-state imaging device including: a pixel array block in which unit pixels each including a photoelectric conversion element are two-dimensionally arranged in a row and column array, and column signal lines are wired for each column with respect to the matrix arrangement of the unit pixels; and a row scanning device that selectively controls the respective unit pixels of the pixel array block on a row-to-row basis, the solid-state imaging device including a reset device that resets potentials at two input terminals, wherein when performing AD conversion for converting an analogue signal to a digital signal using a comparing device having a configuration of a differential amplifier that compares the analogue signal provided to one input terminal via the column signal line from the unit pixel of a row which is selectively controlled by the row scanning device and an inclined reference signal provided to the other input terminal, a voltage at the other input terminal is changed to a predetermined voltage after a resetting operation by the reset device, then a comparison period from the initiation to the completion of the comparison performed by the comparing device is counted by varying the reference signal into an inclined state, and the AD conversion is performed on the basis of the comparison period.

In the solid-state imaging device configured as described above, the voltage at the input terminal to which the reference voltage at the comparing device is applied is changed to a predetermined voltage once after the resetting operation by the reset device, then, the reference signal is varied in the inclined state, so that even though there remains a variation in voltage to some extent at the two input terminals, since the voltage at the input terminal to which the reference signal of the comparing device is provided is normally higher than the voltage at the input terminal to which the analogue signal is provided, the output of the comparing device is reliably inverted while the reference signal is being inputted, that is, during the comparison period for comparing the reference signal and the analogue signal.

According to an embodiment of the present invention, since the comparison output can be reliably inverted while the reference signal is being entered in the AD converting operation using the comparator having a configuration of the differential amplifier, the AD converting operation can be performed reliably.

DESCRIPTION OF THE PREFERRED EMBODIMENTS

Configuration of CMOS Image Sensor

Figure 1:
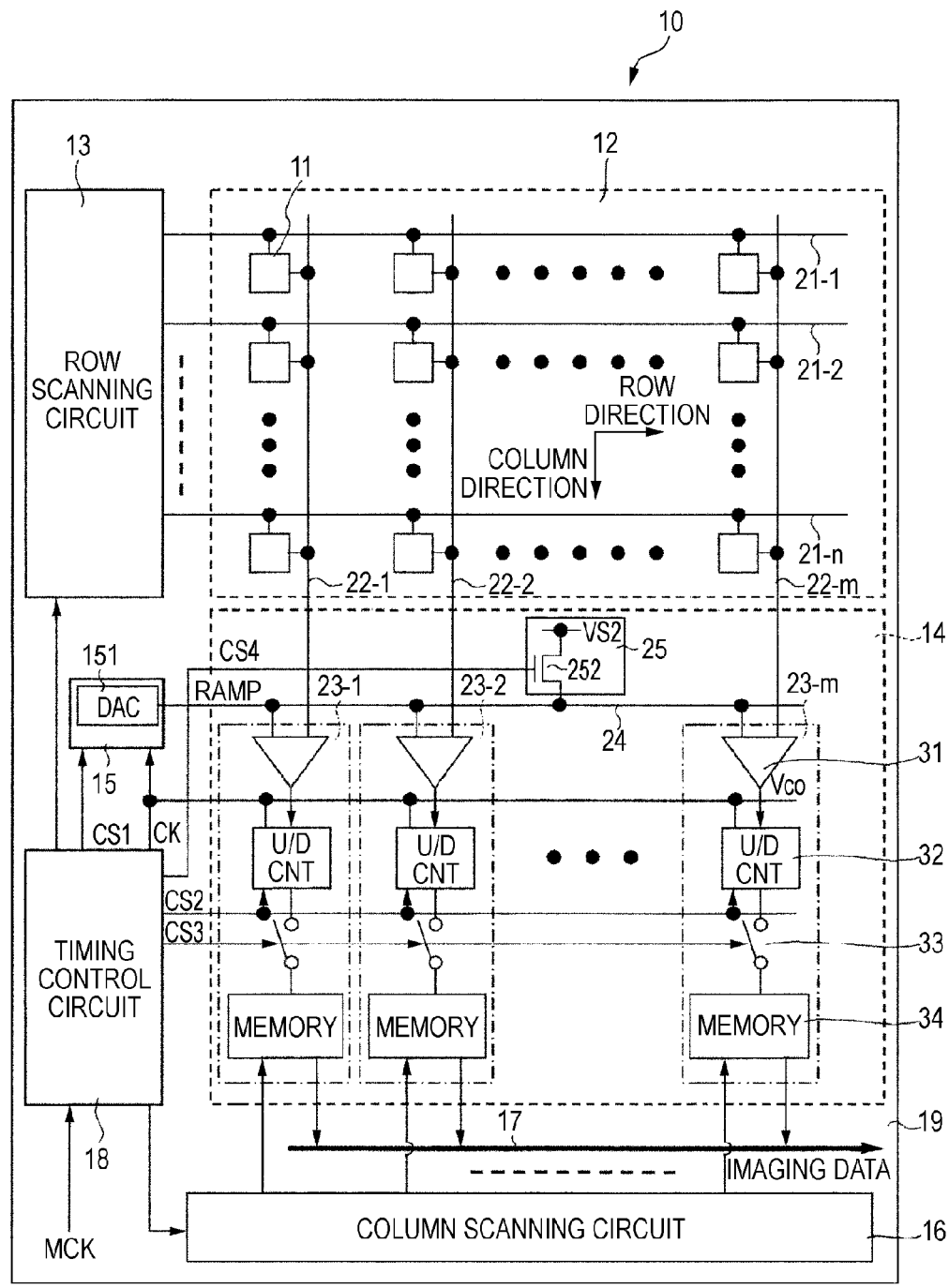
FIG. 1 is a block diagram showing a configuration of a CMOS image sensor including a column parallel ADC mounted thereon according to an embodiment of the present invention.

FIG. 1 is a block diagram showing a configuration of a solid-state imaging device according to an embodiment of the present invention, for example, a CMOS image sensor including a column parallel ADC mounted thereon.

As shown in FIG. 1, the CMOS image sensor 10 according to the embodiment of the present invention includes a pixel array block 12 in which a number of unit pixels 11 each having a photoelectric conversion element arranged two-dimensionally in a row and column (matrix) array, a row scanning circuit 13, a column processing block 14, a reference voltage supplying unit 15, a column scanning circuit 16, a horizontal output line 17 and a timing control circuit 18.

In this system configuration, the timing control circuit 18 generates clock signals and control signals which serve as a reference of operations of the row scanning circuit 13, the column processing block 14, the reference voltage supplying unit 15 and the column scanning circuit 16 on the basis of a master clock MCK, and provides these signals to the row scanning circuit 13, the column processing block 14, the reference voltage supplying unit 15 and the column scanning circuit 16.

A drive system and a signal processing system in the periphery for driving and controlling the respective unit pixels 11 of the pixel array block 12, that is, the peripheral circuits such as the row scanning circuit 13, the column processing block 14, the reference voltage supplying unit 15, the column scanning circuit 16, the horizontal output line 17 and the timing control circuit 18 are integrated on a chip (semiconductor substrate) 19 shared with the pixel array block 12.

The unit pixel 11 employed here, although not shown in the drawing, may have a three-transistor configuration including, for example, a transfer transistor that transfers electric charges obtained by photoelectric conversion by a photoelectric conversion element to an FD (floating diffusion) unit, a reset transistor for controlling the potential of the FD unit, and an amplifier transistor that outputs a signal according to the potential of the FD unit in addition to the photoelectric conversion element (for example, photodiode), or a four-transistor configuration further including a selection transistor that selects the pixel separately.

The pixel array block 12 includes the unit pixels 11 two-dimensionally arranged in m columns×n rows, row control lines 21 (21-1 to 21-n) wired for each row of the m columns×n rows pixel array, and column signal lines 22 (22-1 to 22-m) for each column thereof. The row control lines 21-1 to 21-n are connected at respective ends on one side thereof to respective output terminals of the row scanning circuit 13 corresponding to the respective rows. The row scanning circuit 13 includes a shift resistor and a decoder and controls a row address or a row scanning of the pixel array block 12 via the row control lines 21-1 to 21-n.

The column processing block 14 includes ADCs (analogue-digital converting circuits) 23-1 to 23-m provided for the respective pixel columns, that is, for the respective column signal lines 22-1 to 22-m, and converts the analogue signals outputted from the respective unit pixels 11 of the pixel array block 12 on a column-to-column basis into the digital signals and outputs the same. Configuration of these ADCs 23-1 to 23-m according to an embodiment of the present invention will be described in detail later.

The reference voltage supplying unit 15 includes, for example, a DAC (digital-analogue converting circuit) 151 as a device for generating a reference voltage RAMP having so-called a RAMP waveform, in which a level varies stepwise (is inclined downward in this example) over time. The device for generating the reference voltage RAMP having the RAMP waveform is not limited to the DAC 151.

The DAC 151 generates the reference voltage RAMP on the basis of a clock CK provided from the timing control circuit 18 under control of a control signal CS1 provided from the timing control circuit 18, and supplies the same to the ADCs 23-1 to 23-m in the column processing block 15 respectively via a reference signal line 24.

The configuration of the ADCs 23-1 to 23-m according to the embodiment of the present invention will be described in detail.

The ADCs 23-1 to 23-m are respectively configured to be able to perform selectively an AD converting operation corresponding to respective operation modes; a normal frame rate mode in a progressive scanning system that reads information on all the unit pixels 11 and a high-speed frame rate mode in which an exposure time of the unit pixel 11 is set to 1/N and a frame rate is increased to N-times, for example, 2 times of the normal frame rate mode.

Mode switching between the normal frame rate mode and the high-speed frame rate mode is executed by control by control signals CS2, CS3 provided by the timing control circuit 18. The timing control circuit 18 receives instruction information for switching the operating modes between the normal frame rate mode and the high-speed frame rate mode from an external host device (not shown).

All the ADCs 23-1 to 23-m have the same configuration, and hence the ADC 23-m will be described as an example. The ADC 23-m includes a comparator 31, an up/down counter (represented as U/DCNT in the drawing) 32 as a counting device, a transfer switch 33 and a memory unit 34.

The comparator 31 compares a signal voltage Vx of the column signal line 22-m according to a signal outputted from the respective unit pixels 11 on the $n^{th}$ column in the pixel array block 12 with the reference voltage RAMP having the RAMP waveform supplied from the reference voltage supplying unit 15. For example, when the reference voltage RAMP is larger than the signal voltage Vx, an output Vco becomes an "H" level, and when the reference voltage RAMP is lower than the signal voltage Vx, the output Vco becomes an "L" level. Examples of the circuit and the operation of the comparator 31 will be described later in detail.

The up/down counter 32 is an asynchronous counter, which receives the clock CK from the timing control circuit 18 simultaneously with the DAC 151 under the control of the control signal CS2 supplied from the timing control circuit 18, and performs DOWN-count or UP-count synchronously with the clock CK to count a comparison period from the initiation of a comparing operation to the termination of the comparing operation by the comparator 31.

More specifically, in the normal frame rate mode, at a signal reading operation from the single unit pixel 11, a comparison period at the time of a first reading operation is obtained by performing the down-count during the first reading operation, and a comparison period at the time of a second reading operation is obtained by performing the up-count during the second reading operation.

On the other hand, in the high-speed frame rate mode, the comparison period at the time of the first reading operation is obtained by retaining the counted result for the unit pixel 11 of a certain row as is and, subsequently, performing the down-count from the previous counted result for the unit pixel 11 of the next row during the first reading operation, and the comparison period at the time of the second reading operation is obtained by performing the up-count during the second reading operation.

Under the control of the control signal CS3 provided by the timing control circuit 18, in the normal frame rate mode, the transfer switch 33 is turned ON (closed) state at a time point when the counting operation of the up/down counter 32 for the unit pixel 11 of a certain row is completed, and transfers the counted result of the up/down counter 32 to the memory unit 34.

On the other hand, in the case of the high-speed frame rate of N=2, the transfer switch 33 stays in OFF (opened) state at a time point when the counting operation of the up/down counter 32 for the unit pixel 11 of a certain row is completed, and subsequently, is turned ON at a time point when the counting operation of the up/down counter 32 for the unit pixel 11 of the next row is completed to transfer the counted result for the two pixels in the vertical direction of the up/down counter 32 to the memory unit 34.

In this manner, analogue signals supplied from the respective unit pixels 11 in the pixel array block 12 via the column signal lines 22-1 to 22-m on a column-to-column basis are converted into N-bit digital signals by the respective operations of the comparators 31 and the up/down counters 32 in the ADCs 23 (23-1 to 23-m) and are stored to the memory units 34 (34-1 to 34-m).

The column scanning circuit 16 includes a shift register, and controls the row address or the column scanning of the ADCs 23-1 to 23-m in the column processing block 14. Under the control of the column scanning circuit 16, the N-bit digital signals which are AD-converted by the respective ADCs 23-1 to 23-m are read into the horizontal output line 17 in sequence, and are outputted as imaging data via the horizontal output line 17.

Although not shown in the drawing since it has no direct relation to the present invention, a circuit or the like for performing various signal processing on the imaging data outputted via the horizontal output line 17 may be provided in addition to the above-described components.

Since the CMOS image sensor 10 including the column parallel ADCs mounted thereon according to the embodiment of the present invention configured as described above can selectively transfer the counted results of the up/down counters 32 to the memory units 34 via the transfer switch 33, the counting operation of the up/down counters 32 and the reading operation of the counted results of the up/down counters 32 to the horizontal output line 17 can be controlled independently.

Example of Circuit of Comparator 31

Figure 2:
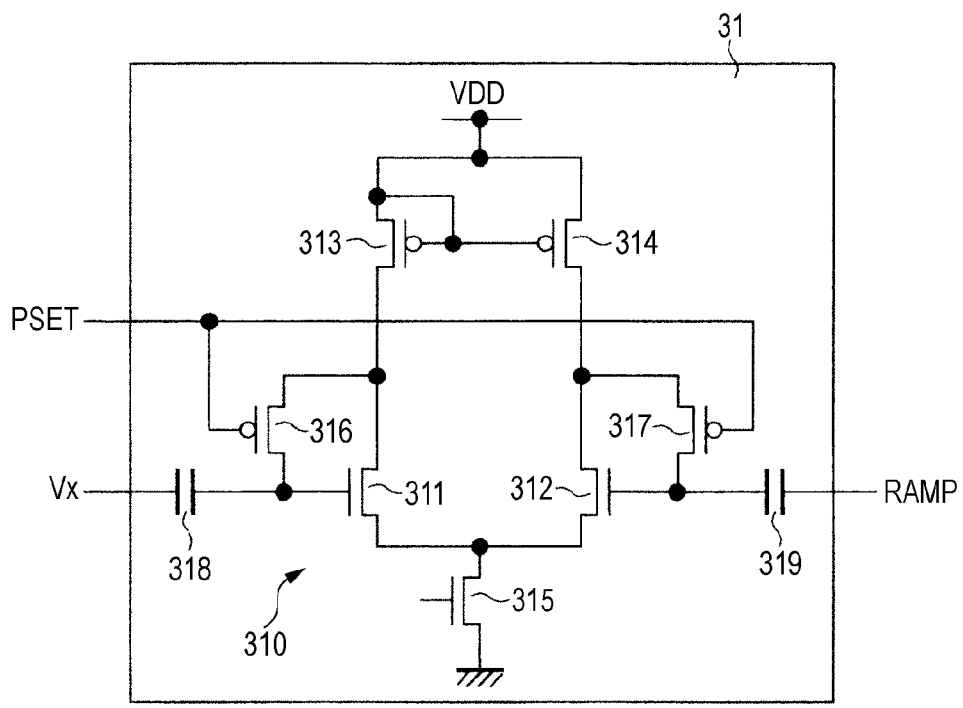
FIG. 2 is a circuit diagram showing an example of a circuit of a comparator having a configuration of a differential amplifier.

FIG. 2 shows a circuit drawing showing an example of a detailed circuit configuration of the comparator 31. The comparator in this example 31 is a differential comparator including a differential amplifier 310 as a basic structure.

In FIG. 2, the differential amplifier 310 includes Nch. input transistor pair 311, 312 commonly connected to a source, Pch. transistor pair 313, 314 connected between respective drains of the transistor pair 311, 312 and a power source VDD and commonly connected to a gate, and a Nch. current source transistor 315 connected between a common-source connecting node of the input transistor pair 311, 312 and the ground.

In this differential amplifier 310, Pch. transistors 316, 317 are connected between the respective gates and drains of the input transistor pair 311, 312. These transistors 316, 317 serve as reset devices that are turned ON when a Low active reset pulse PSET is applied to respective gates to short circuit the respective gates and the drains of the input transistor pair 311, 312, thereby resetting respective gate voltages of the transistor pair 311, 312, that is, the voltage at two input terminals of the comparator 31.

Respective one-ends of capacities 318, 319 for cutting down a DC level are connected respectively to the respective gates of the input transistor pair 311, 312. The other end of the capacity 318 is connected to the column signal lines 22 (22-1 to 22-m) for transferring the analogue signals Vx outputted from the respective unit pixels 11 of the pixel array block 12. The other end of the capacity 319 is connected to the reference signal line 24 for transferring the reference voltage RAMP generated by the DAC 151.

Example of Operation of Comparator 31

Figure 3:
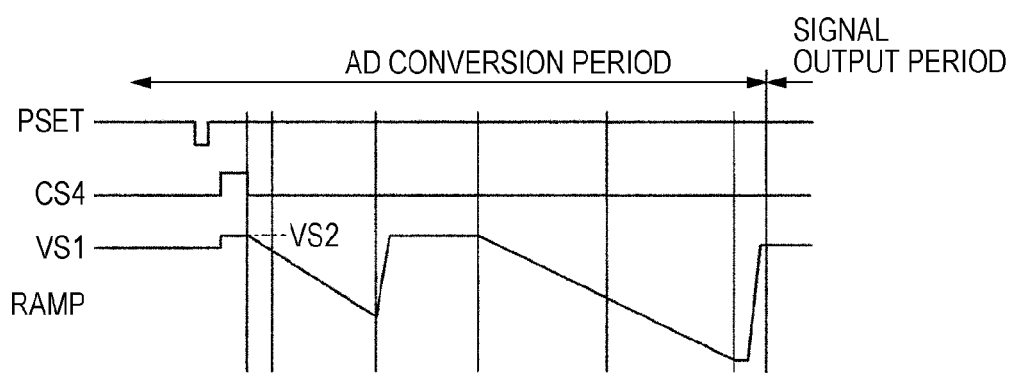
FIG. 3 is a timing chart for explaining a circuit operation of the comparator.

Referring now to a timing chart in FIG. 3, the circuit operation of the comparator 31 configured as described above will be described.

A reset component described later is read out to the column signal lines 22 from the unit pixel 11, and an arbitrary voltage VS1 is applied from the DAC 151 to the reference signal line 24. After potentials of the column signal line 22 and the reference signal line 24 are stabilized, and immediately before the comparison is initiated, the reset pulse PSET is activated (Low active). Consequently, the transistors 316, 317 are turned ON to short circuit the respective gates and drains of the input transistor pair 311, 312, thereby resetting operating points of the input transistor pair 311, 312 as the drain voltage.

At the determined operating point, the two input terminal voltages of the differential amplifier 310, that is, the offset components of the respective gate voltages of the input transistor pair 311, 312 (DC offset of the analogue signal Vx and the reference voltage RAMP, and an offset caused by variation in threshold value of the input transistor pair 311, 312 are almost cancelled (hereinafter, this operation is referred to as "auto-zero"). In other words, the two input terminal voltages of the differential amplifier 310 become almost the same. The auto-zero enables shortening of the comparison period between the analogue signal Vx and the reference voltage RAMP thereafter.

However, in the auto-zero, a slight variation in two input terminal voltages at the differential amplifier 310 might remain in a case in which the auto-zero period is short. Therefore, when the reference voltage RAMP is entered to the comparator 31 as is from the arbitrary voltage VS1 and is compared with the analogue signal Vx, the output Vco of the comparator 31 may be normally inverted while the reference voltage RAMP is being entered. However, there is a possibility that the output Vco of the comparator 31 is not inverted at all, or is inverted immediately after the reference voltage RAMP is entered. In a case in which the offset is completely cancelled as well, when the reference voltage RAMP is entered as is from the arbitrary voltage VS1 to perform the comparison with the analogue signal Vx, the output Vco of the comparator 31 is not inverted at all, or is inverted immediately after the reference voltage RAMP is entered.

Therefore, for example, this embodiment employs a configuration in which a changing unit 25 for changing the potential of the reference signal line 24 is added to change the voltage at the input terminal to which the potential of the reference signal line 24, that is, the reference voltage RAMP of the comparator 31 is applied from the arbitrary voltage VS1 to a higher voltage VS2 (VS2>Vs1) after the auto zero, that is, after the resetting operation by the transistors 316, 317 as the reset device by the operation of the changing unit 25.

The changing unit 25 includes, for example, an Nch. transistor 252 connected between a voltage line 251 to which the voltage VS2 is applied and the reference signal line 24. The transistor 252 is turned ON by applying a High active control pulse CS4 generated by the timing control circuit 15 to the gate after the auto-zero, that is, after the reset pulse PSET is distinguished, and applies the voltage VS2 to the reference signal line 24.

In this manner, by configuring to change the voltage at the input terminal to which the reference voltage RAMP of the comparator 31 is applied from the voltage VS1 to the voltage VS2 once after the auto-zero, that is, after the resetting operation by the transistors 316, 317, and then cause the reference voltage RAMP to be changed stepwise, even when the slight variation in the two input terminal voltages of the differential amplifier 310 remains in the case in which the auto-zero period is short, the voltage at the input terminal to which the reference voltage RAMP of the comparator 31 is applied becomes higher than the voltage at the input terminal to which the analogue signal Vx is provided. Therefore, inversion of the output Vco of the comparator 31 while the reference voltage RAMP is being entered, that is, during the comparison period between the reference voltage RAMP and the analogue signal Vx is ensured. In other words, the possibility that the output Vco of the comparator 31 is not inverted at all or that it is inverted immediately after the reference voltage RAMP is entered is eliminated.

As regards the voltage VS2, when a voltage value is extremely larger in comparison with the voltage VS1, the output voltage Vco of the comparator 31 is not inverted unless the comparison period between the reference voltage RAMP and the analogue signal Vx is set to a long period. Therefore, it is preferable to set the voltage VS2 to a voltage value to an extent that can compensate the variation in the auto-zero, that is, the difference of the two input terminal voltages of the differential amplifier 310 after the resetting operations by the transistors 316, 317, generally to a range between several mV to several tens of mV.

In this example, the changing unit 25 including the Nch. transistor 252 connected between the voltage line 251 and the reference signal line 24 is provided, so as to change the voltage at the input terminal to which the reference voltage RAMP of the comparator 31 is applied to the predetermined voltage VS2 by the operation of the changing unit 25. However, it is only an example, and the changing device for changing the voltage at the input terminal to which the reference voltage RAMP of the comparator 31 is applied to the predetermined voltage VS2 is not limited to the changing unit 25 including the transistor 252.

As another example of the changing device, for example, the DAC 151 that generates the reference voltage RAMP itself may be employed. In this DAC 151, the voltage at the input terminal to which the reference voltage RAMP of the comparator 31 is applied can be changed to the predetermined voltage VS2 by generating the arbitrary voltage VS1, then generating the predetermined voltage VS2 once, and then generating the reference voltage RAMP having the RAMP waveform, but not by generating the reference voltage RAMP directly from the arbitrary voltage VS1.

Figure 4:
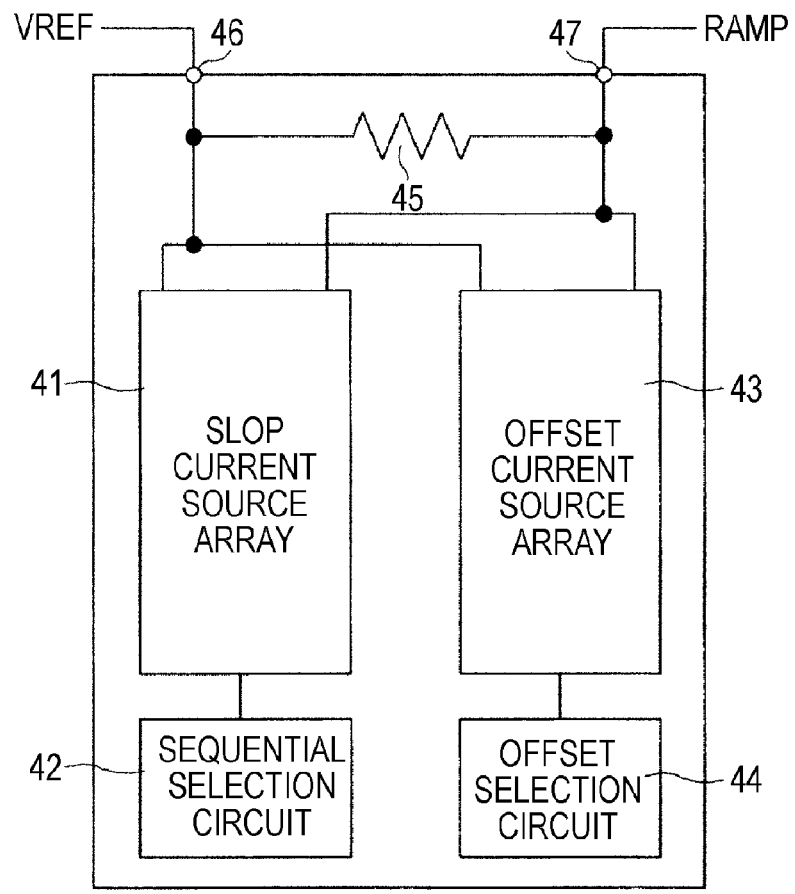
FIG. 4 is a block diagram showing an example of a detailed configuration of a DAC having a function of a changing device.

The DAC 151 having the function of the changing device will be described with a detailed example below. FIG. 4 is a block diagram showing a detailed configuration of the DAC 151 which has a function of the changing device.

As shown in FIG. 4, the DAC 151 according to this example includes a slope current source array 41, a sequential selection circuit 42, an offset current source array 43, an offset selection circuit 44 and a resistance 45. The resistance 45 is connected between a circuit input terminal 46 and a circuit output terminal 47. A predetermined reference voltage VREF is applied to the circuit input terminal 46.

Figure 5:
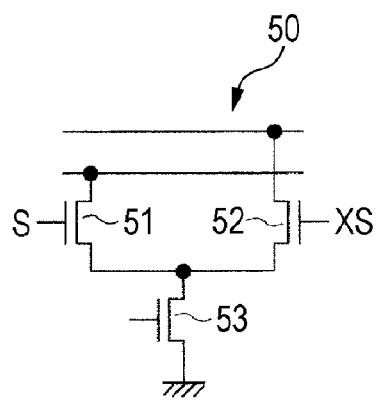
FIG. 5 is a circuit diagram showing an example of a configuration of a unit current source circuit which constitutes a current source array of the DAC.

The slope current source array 41 includes unit current source circuits 50 configured as shown in FIG. 5 arranged in an array. The unit current source circuit 50 includes, for example, Nch. switch transistor pair 51, 52 to which the source is commonly connected, and a current source transistor 53 connected between the common-source connecting node and the ground of these switch transistor pair 51, 52. The offset current source array 43 also includes the unit current source circuits 50 arranged in an array in the same manner as the slope current source array 41.

In the DAC 151 having the configuration as described above, when a control pulse S or an inverted pulse XS of the unit current source circuit 50 is activated and the switch transistor 51 or 52 is turned ON, a current flows to an end of the resistance 45, and hence the reference voltage RAMP outputted from the circuit output terminal 47 varies. The reference voltage RAMP having a slope waveform (stepwise waveform) is generated by one of the switch transistor pair (51 or 52) of the unit current source circuit 50 being turned ON in sequence so as to increase the current flowing toward the circuit output terminal 47 of the resistance 45 gradually according to the sequential selection by the sequential selection circuit 42.

The predetermined voltage VS2 can be generated as an offset by controlling the switch transistor pair 51, 52 of the unit current source circuit 50 in the same manner as generation of the reference voltage RAMP before generating the reference voltage RAMP. The arbitrary voltage (offset) VS1 is outputted from the circuit output terminal 47 by the control that causes a current of the arbitrary unit current source circuit 50 to flow toward the circuit input terminal 46 of the resistance 45 by an output of the offset selection circuit 44 which is determined according to the offset amount which can be set as desired from the outside.

The changing device may be of any configuration as long as the voltage at the input terminal to which the reference voltage RAMP of the comparator 31 is applied can be change from the arbitrary voltage VS1 to the predetermined voltage VS2 once, and is not limited to the above-described two examples.

Operation of the CMOS Image Sensor

Figure 6:
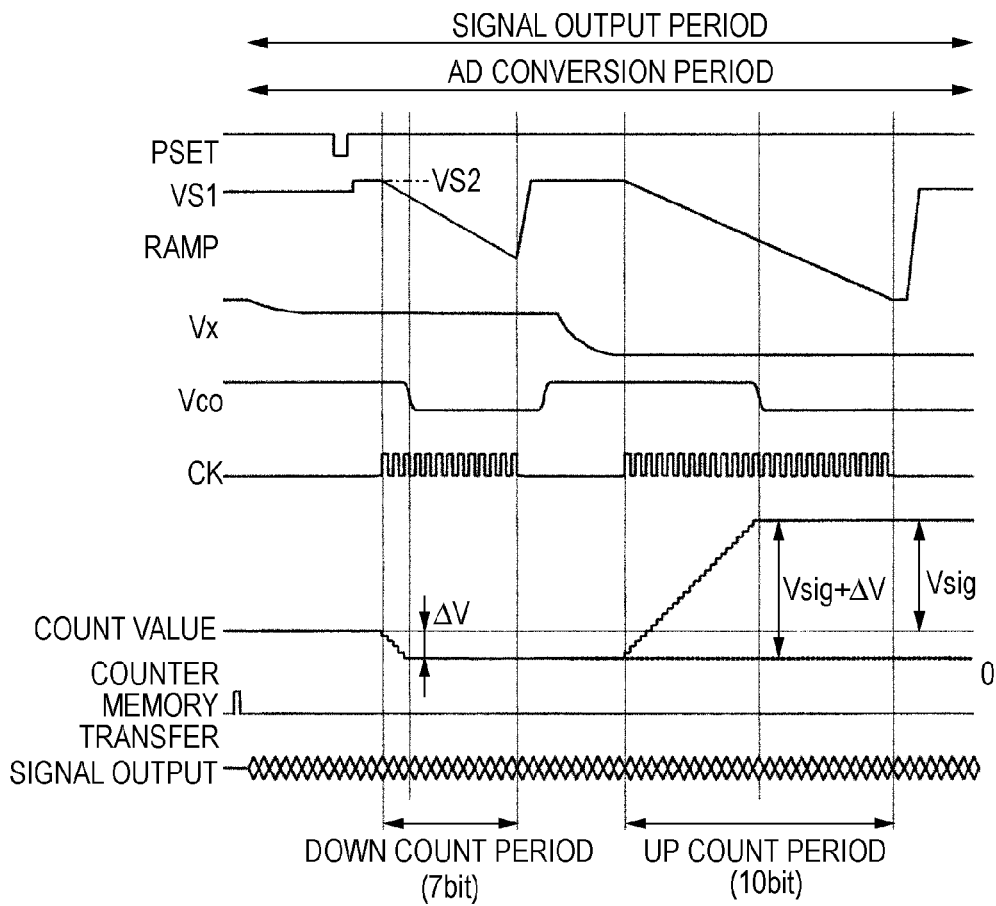
FIG. 6 is a timing chart for explaining a circuit operation of the CMOS image sensor according to an embodiment of the present invention.

Referring now to a timing chart in FIG. 6, a general operation of the CMOS image sensor 10 configured as described above will be described.

Although description of the detailed operation of the unit pixel 11 will be omitted here, the resetting operation and the transfer operation are performed in the unit pixel 11, a potential of the FD unit when being reset to a predetermined potential is outputted from the unit pixel 11 to the column signal line 22-1 to 22-$m$ as a reset component in the resetting operation, and the potential of the FD unit when the electric charge generated by the photoelectric conversion is transferred from the photoelectric conversion element is outputted from the unit pixel 11 to the column signal lines 22-1 to 22-$m$ as a signal component in the transfer operation as publicly known.

First, the arbitrary voltage VS1 is set by the DAC 151. Then, after a certain row i is selected by the row scanning circuit 13 through the row scanning operation, and a first reading operation from the unit pixel 11 of the selected row i to the column signal lines 22-1 to 22-$m$ is stabilized, the comparator 31 is reset by the reset pulse PSET, and then the voltages of the input terminals of the ADCs 23-1 to 23-$m$ to which the reference voltage RAMP of the respective comparators 31 is applied are changed from the arbitrary voltage VS1 to the predetermined voltage VS2 by the changing unit 25, and then the reference voltage RAMP having the RAMP waveform is applied from the DAC 151 to the respective comparators 31, so that the respective signal voltages (analogue signal) Vx of the column signal lines 22-1 to 22-$m$ and the reference voltage RAMP are compared in the comparators 31.

When the clock CK is applied to the up/down counter 32 from the timing control circuit 18 simultaneously with supply of the reference voltage RAMP to the comparators 31, the up/down counter 32 counts the comparison period with the comparator 31 during the first reading operation by the down-counting operation. Then, when the reference voltage RAMP and the signal voltages Vx of the column signal lines 22-1 to 22-*m* become the same, the output Vco of the comparator 31 is inverted from the "H" level to the "L" level. The up/down counter 32 stops the down-counting operation and retains a count value according to the first comparison period with the comparator 31 in response to inversion of the polarity of the output Vco of the comparator 31.

In the first reading operation, as described above, the reset component ΔV of the unit pixel 11 is read. A fixed pattern noise which varies from the unit pixel 11 to the unit pixel 11 is included in the reset component ΔV as the offset. However, since the variation in the reset component ΔV is generally small and the reset level is common for all the pixels, the signal voltages Vx of the column signal lines 22-1 to 22-*m* are almost known. Therefore, when the first reset component ΔV is read out, the comparison period can be shortened by adjusting the reference voltage RAMP. In this embodiment, comparison of the reset component ΔV is performed in a count period (128 clocks) which corresponds to 7 bits.

In the second reading operation, in addition to the reset component ΔV, a signal component Vsig according to the amount of incident light for the respective unit pixels 11 is read out by the same operation as the first reading operation of the reset component ΔV. In other words, when the second reading operation from the unit pixel 11 of the selected row i to the column signal lines 22-1 to 22-*m* is stabilized, and the reference voltage RAMP is applied from the DAC 151 to the comparators 31 of the ADCs 23-1 to 23-*m*, whereby the comparator 31 performs the comparing operation between the respective signal voltages Vx of the column signal lines 22-1 to 22-*m* and the reference voltage RAMP, and simultaneously, the second comparison period performed by the comparator 31 is counted by the up-counting operation which is opposite from the first operation by the up/down counter 32.

In this manner, by setting the counting operation of the up/down counter 32 to perform firstly the down-counting operation, and secondly the up-counting operation, a subtracting process of (second comparison period)−(first comparison period) is automatically performed in the up/down counter 32. Then, when the reference voltage RAMP and the signal voltage Vx of the column signal lines 22-1 to 22-*m* become the same, the polarity of the output Vco of the comparator 31 is inverted, and in response to the inversion of the polarity, the counting operation of the up/down counter 32 is stopped. Consequently, the count value according to the result of the subtracting process of (second comparison period)−(first comparison period) is retained in the up/down counter 32.

Since the expression: (second comparison period)−(first comparison period)=(signal component Vsig+reset component ΔV+offset component of ADC 23)−(reset component ΔV+offset component of ADC 23)=(signal component Vsig) is established, and the offset component for each ADC 23 (23-1 to 23-*m*) is removed in addition to the reset component ΔV including variations from the unit pixel 11 to the unit pixel 11 by the above-described twice reading operation and the subtracting process in the up/down counter 32. Therefore, only the signal component Vsig according to the amount of incident light for each unit pixel 11 can be extracted. The process to eliminate the reset component ΔV including the variations from the unit pixel 11 to the unit pixel 11 is so called CDS (Correlated Double Sampling; relative double sampling) process.

Since the signal component Vsig according to the amount of incident light is read out at the time of second reading operation, it is necessary to change the reference voltage RAMP significantly for determining whether or not the amount of incident light is significant in a wide range. Therefore, the CMOS image sensor 10 in this embodiment is adapted to compare the reading out of the signal component Vsig during the count period (1024 clocks) which corresponds to the 10 bits. In this case, although the comparison bit number is different between the first reading operation and the second reading operation, the accuracy of the AD conversion can be equalized by equalizing the inclinations of the RAMP waveform of the reference voltage RAMP in the first and the second reading operations. Therefore, an accurate subtracted result can be obtained as a result of the subtracting process of (second comparison period)−(first comparison period) by the up/down counter 32.

After the above-described series of the AD converting operation, an N bit digital value is retained in the up/down counter 32. Then, the N-bit digital values (digital signal) which are AD-converted in the respective ADCs 23-1 to 23-*m* in the column processing block 14 are outputted in sequence to the outside via the horizontal output line 17 of N bit in width by the column scanning by the column scanning circuit 16. Subsequently, a two-dimensional image is generated by repeating the same operation for each column in sequence.

As described above, in the CMOS image sensor 10 including the column parallel ADC mounted thereon, the output Vco of the comparator 31 is reliably inverted during the input of the reference voltage RAMP, that is, during the comparison period between the reference voltage RAMP and the analogue signal Vx by changing the voltage at the input terminal to which the reference voltage RAMP of the comparator 31 is applied into the voltage VS2 once from the voltage VS1 after the auto-zero, that is, after the resetting operation by the transistors 316, 317 as the reset device, and then changing the reference voltage RAMP stepwise (inclined) without depending on the reset state of the comparator 31 by the reset pulse PSET.

In other words, even though there remains a variation to some extent at the two input terminal voltages of the differential amplifier 310 in the case in which the auto-zero period is short, the voltage at the input terminal of the comparator 31 to which the reference voltage RAMP is applied is normally higher than the voltage at the input terminal to which the analogue signal Vx is applied. Therefore, the output Vco of the comparator 31 is reliably inverted during the comparison period between the reference voltage RAMP and the analogue signal Vx. Consequently, the AD converting operation can be performed reliably. Then, by counting the comparison period from the initiation to the completion of the comparison by the comparator 31 with the up/down counter 32, the signal voltage (analogue signal) Vx can be converted to the digital signal on the basis of the comparison period.

According to the CMOS image sensor 10 including the column parallel ADC according to this embodiment mounted thereon, since the ADCs 23-1 to 23-*m* each include the memory unit 34, the digital value of the unit pixel 11 of the $i^{th}$ row after AD conversion is transferred to the memory unit 34, and then outputted from the horizontal output line 17 to the outside, while the reading operation and the up/down counting operation of the unit pixel 11 of the $i+1^{st}$ row can be performed simultaneously in parallel.

However, it is not essential to provide the memory unit 34 for each of ADCs 23-1 to 23-*m*. In other words, the present invention can also be applied to a CMOS image sensor of a configuration in which the respective ADCs 23-1 to 23-*m* each do not have the memory unit 34 as in the case of the CMOS image sensor 10 including the column parallel ADC mounted thereon according to the embodiment shown above.

Example of Application

The CMOS image sensor including the column parallel ADC mounted thereon according to the above-described embodiment is preferable to be used as an imaging device in the imaging apparatus such as a video camera, digital still camera, or a camera module for a mobile device such as a cellular phone.

Figure 7:
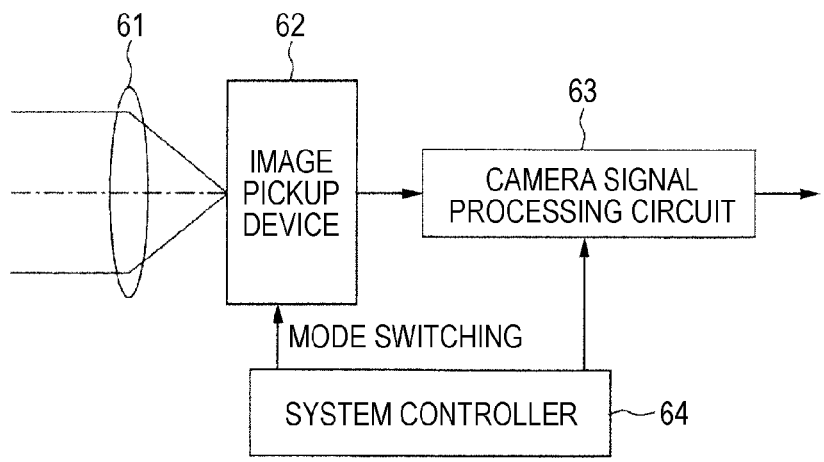
FIG. 7 is a block diagram showing an example of a configuration of an imaging apparatus according to an embodiment of the present invention.
Figure 8:
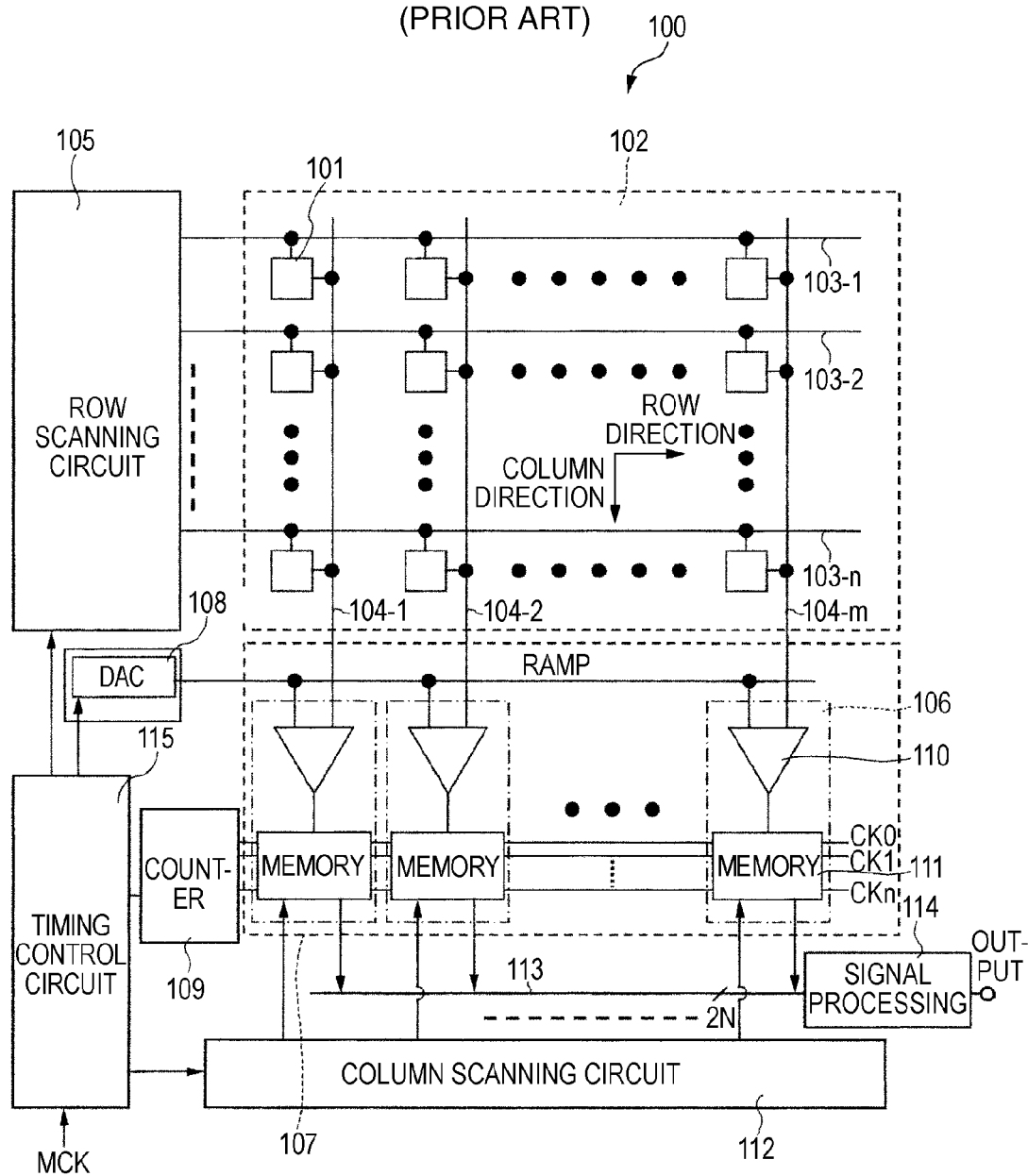
FIG. 8 is a block diagram showing a configuration of a CMOS image sensor including a column parallel ADC mounted thereon according to the related art.
Figure 9:
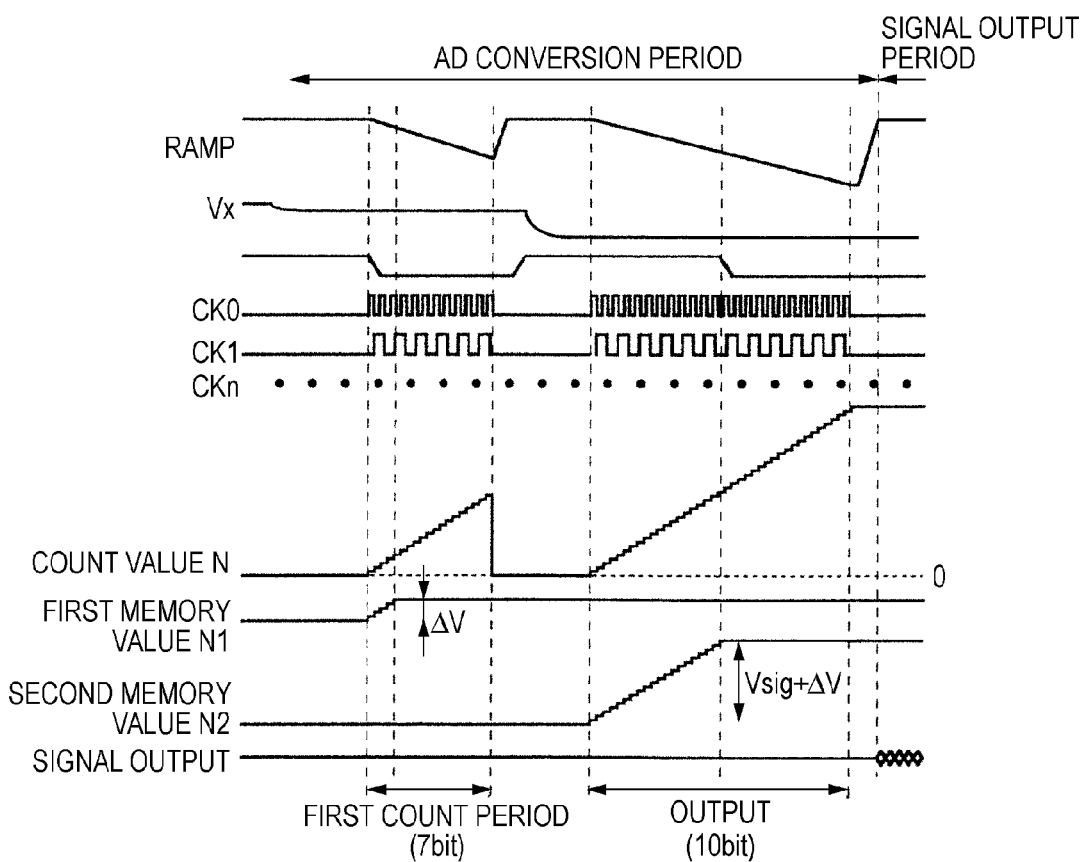
FIG. 9 is a timing chart for explaining a circuit operation of the CMOS image sensor according to the related art.

FIG. 7 is a block diagram showing an example of a configuration of the imaging apparatus according to an embodiment of the present invention. As shown in FIG. 7, the imaging apparatus according to this example includes an optical system including a lens 61, an imaging device 62, a camera signal processing circuit 63 and a system controller 64.

The lens 61 forms an image of an image light from a photographic object on an imaging plane of the imaging device 62. The imaging device 62 outputs an imaging signal which can be obtained by converting the image light formed as an image on the imaging plane by the lens 61 into an electric signal on a pixel by pixel basis. The CMOS image sensor 10 including the column parallel ADC mounted thereon according to the embodiment described above is used as the imaging device 62.

The camera signal processing circuit 63 performs various signal processing for the imaging signal outputted from the imaging device 62. The system controller 64 controls the imaging device 62 or the camera signal processing circuit 63. In particular, when the column parallel ADC of the imaging device 62 can perform the AD converting operation corresponding to the respective operating modes including the normal frame rate mode and the high-speed frame rate mode in which the exposure time of the pixel is set to 1/N to increase the frame rate to N times higher in comparison with the normal frame rate mode in the progressive scanning system which reads information on every pixel, the switching control of the operation mode according to the instruction from the outside is performed.

It should be understood by those skilled in the art that various modifications, combinations, sub-combinations, and alterations may occur depending on design requirements and other factors insofar as they are within the scope of the appended claims or the equivalents thereof.

What is claimed is:

1. A solid-state imaging device comprising:
a pixel array block including unit pixels each having photoelectric conversion units two-dimensionally arranged in a row and column array and column signal lines wired for each column with respect to the row and column arrangement of the unit pixels;
a row scanning device that selectively controls the respective unit pixels in the pixel array block on a row-to-row basis; and
an analogue-digital conversion device that compares an analogue signal outputted from the unit pixel of a row which is selectively controlled by the row scanning device via the column signal line with an inclined reference signal, and converts the analogue signal into a digital signal on the basis of a comparison period;
the analogue-digital conversion device including:
a comparing device having two input terminals, a reset device that resets potentials at the two input terminals and having a configuration of a differential amplifier that compares the analogue signal applied to one of the two input terminals with a reference voltage applied to the other of the two input terminals
a counting device that counts a comparison period from initiation to completion of comparison performed by the comparing device; and
a changing device that changes a voltage at the other input terminal to a predetermined voltage after a resetting operation performed by the reset device.

2. The solid-sate imaging device according to claim 1, wherein the predetermined voltage is set to a voltage value that compensates a voltage difference between the two input terminals after the resetting operation performed by the reset device.

3. In a solid-state imaging device including: a pixel array block including unit pixels each having photoelectric conversion units two-dimensionally arranged in a matrix array and column signal lines wired for each column with respect to the matrix arrangement of the unit pixels; and a row scanning device that selectively controls the respective unit pixels in the pixel array block on a row-to-row basis;
a driving method for the solid-state imaging device for converting an analogue signal to a digital signal using a comparing device having two input terminals, a reset device that resets potentials at the two input terminals and having a configuration of a differential amplifier that compares the analogue signal provided to one of the two input terminals via the column signal line from the unit pixel of a row selectively controlled by the row scanning device with an inclined reference signal provided to the other of the two input terminals, the method comprising the steps of:
changing the voltage at the other input terminal to a predetermined voltage after the resetting operation performed by the reset device;
counting a comparison period from initiation to completion of comparison performed by the comparing device by causing the reference signal to be inclined; and
converting the analogue signal to the digital signal on the basis of the comparison period.

4. An imaging apparatus comprising:
a solid-state imaging device; and an optical system that forms an image of image light from a photographic object on an imaging plane of the solid-state imaging device,
the solid-state imaging device including:
a pixel array block including unit pixels each having photoelectric conversion units two-dimensionally arranged in a row and column array and column signal lines wired for each column with respect to the matrix arrangement of the unit pixels;
a row scanning device that selectively controls the respective unit pixels in the pixel array block on a row-to-row basis;
an analogue-digital conversion device that compares an analogue signal outputted from the unit pixel of a row which is selectively controlled by the row scanning device via the column signal line with an inclined reference signal, and converts the analogue signal into a digital signal on the basis of a comparison period;
the analogue-digital conversion device including:
a comparing device having two input terminals, a reset device that resets potentials at the two input terminals and having a configuration of a differential amplifier that compares the analogue signal applied to one of the two input terminals with a reference voltage applied to the other of the two input terminals;
a counting device that counts a comparison period from initiation to completion of comparison performed by the comparing device; and
a changing device that changes a voltage at the other input terminal to a predetermined voltage after a resetting operation performed by the reset device.

* * * * *